United States Patent

Marshall et al.

[11] Patent Number: 5,915,082
[45] Date of Patent: Jun. 22, 1999

[54] ERROR DETECTION AND FAULT ISOLATION FOR LOCKSTEP PROCESSOR SYSTEMS

[75] Inventors: Joseph R. Marshall; Dale G. Langston, both of Manassas, Va.

[73] Assignee: Lockheed Martin Corporation, Bethesda, Md.

[21] Appl. No.: 08/660,640

[22] Filed: Jun. 7, 1996

[51] Int. Cl.6 ................................................. G06F 11/08
[52] U.S. Cl. ...................................................... 395/182.09
[58] Field of Search ........................ 395/185.01, 185.02, 395/185.05, 182.09, 182.1, 200.19; 370/228, 221, 217, 218, 220

[56] References Cited

U.S. PATENT DOCUMENTS

| | | | |
|---|---|---|---|
| 4,438,494 | 3/1984 | Budde et al. | 364/200 |
| 4,503,535 | 3/1985 | Budde et al. | 371/11 |
| 4,823,256 | 4/1989 | Bishop et al. | 364/200 |
| 4,916,704 | 4/1990 | Bruckert et al. | 371/68.3 |
| 5,138,708 | 8/1992 | Vosbury | 395/575 |
| 5,226,152 | 7/1993 | Klug et al. | 395/575 |
| 5,233,615 | 8/1993 | Goetz | 371/36 |
| 5,249,187 | 9/1993 | Bruckert et al. | 371/68.1 |
| 5,249,188 | 9/1993 | McDonald | 371/68.3 |
| 5,255,367 | 10/1993 | Bruckert et al. | 395/200 |
| 5,313,575 | 5/1994 | Beethe | 395/159 |
| 5,339,408 | 8/1994 | Bruckert et al. | 395/575 |
| 5,353,436 | 10/1994 | Horst | 395/550 |
| 5,640,521 | 6/1997 | Whetsel | 395/311 |

*Primary Examiner*—Joseph E. Palys
*Assistant Examiner*—Pierre E. Elisca
*Attorney, Agent, or Firm*—Lane, Aitken and McCann

[57] ABSTRACT

A lockstep processor system adds error detection, isolation, and recovery logic to one or more lockstep processor system functions; namely, control outputs, processor inputs, I/O busses, memory address busses, and memory data busses.

2 Claims, 8 Drawing Sheets

ERROR DETECTION AND FAULT ISOLATION FOR LOCKSTEP PROCESSOR SYSTEMS

This invention was made with Government support under Contract F29601-89-C-0089, awarded by the U.S. Air Force. The Government has certain rights in this invention.

BACKGROUND OF THE INVENTION

1. Field of the Invention

This invention relates to so-called lockstep processor systems. That is, systems with at least two processors (commonly designated as master and slave) processing independently, but in lockstep, the same task with their independently generated results compared in order to detect an error originating in one processor. More particularly, the invention relates to an improved lockstep processor system that provides partial fault isolation in addition to error detection.

2. Description of the Prior Art

In general, prior art lockstep processor systems are designed to detect a failure, and do not typically include hardware and/or software to isolate the source of the error or the processor (master or slave) where the error occurred.

More specifically, in lockstep processors, typically the outputs are tied together. One of the processors is declared as the master and is allowed to drive the outputs, while the other processor is the slave and is only allowed to receive on its outputs. The slave processor compares the master's outputs with its internal outputs to ensure that they are the same. If on a line-by-line basis the outputs do not match, the whole system is stopped due to an error. The problem with this method is the lack of ability to isolate the failure to either the master or the slave processor, since typically code checking is not used on these lines and a consequential lack of ability to recover from a failure by operating in a degraded mode but without stopping the processor.

A classical lockstep technique, implemented with respect to the central output bus, is shown in FIG. 1. Classical lockstep techniques are only concerned about control lines during cycles they are transmitting data. A bit-by-bit compare is performed between the data that is internally generated by one processor (slave processor) and data that has been placed on the external lines by the other processor (master processor). This comparison is valid only during cycles where data is being sent from the master processor. The comparison logic is activated in the slave processor and upon detecting any difference between the processor generated outputs on corresponding lines, the slave processor stops the system and waits for some higher level to initiate isolation and recovery actions.

In lockstep processors, the I/O bus is typically compared only during the cycles that the processor is transmitting data to an I/O device. When the processors are receiving data from an I/O device, the lockstep processors rely on internal data checking to find errors or rely on the processors eventually getting out of sync as a result of the errors. Once out of sync, the processors are stopped since there is no method in the prior art lockstep processor system to determine which processor is at fault. One object of this invention is to determine whether the master or slave processor has failed, to recover from the failure by decoding error detection, and, in addition, to provide lockstep coverage when receiving data from an I/O device.

In the prior art, detection of errors on input lines to lockstep processors, after their synchronization, has essentially been ignored. An assumption has been that both processors saw the same error and would respond in the same manner. If only one processor saw an error, the processors would no longer be synchronized. This lack of synchronization would eventually be detected at an output; but the only recovery action would be to reset the system. Another object of this invention is to detect error inputs to dual lockstep processors, isolate error inputs to a single processor before it corrupts the system, and disable the processor with error inputs.

Lines to a processor that are only inputs typically use either interrupt/error busses or control busses. In general such busses are protected from errors by at least one of the following four methods: parity checking, code checking, duplication, or protocol checking. A typical input bus of this type, with its corresponding checking, is shown in FIG. 1.

In the classical dual lockstep processor configuration, one processor is the master, and it communicates with memory and I/O devices, while the other processor is the slave and it compares the outputs from the master to its internally generated signals to ensure that the master processor is synchronized with the slave. If the processors are not synchronized, the system is stopped.

Due to the large width of the memory address bus, a popular method of detecting any address failure is to perform lockstep comparison on the processor chips. The master processor and slave processor share the memory address lines. The master processor is allowed to drive the address and the slave processor compares what the master has driven to what the slave has generated internally on a bit-by-bit basis. If an error is detected, the system is stopped since comparison checks indicate only that there was a failure but not who failed. With this prior art method there is no isolation and the system cannot automatically change to a degraded mode of operation. A significant delay is incurred to attempt to isolate the error in prior art lockstep processor systems. In addition, the current method can only isolate the failure if the failure is detectable by the diagnostic routines; i.e. the error is not transient.

In prior art lockstep processor systems, the memory data bus is compared only during the cycles that the processor is writing memory. When the processor is reading memory, the lockstep processors rely on internal checking of the data to find errors or rely on the processors eventually getting out of sync. Once out of sync, the processors will be stopped since there is no method to determine who is at fault. An object of this invention is to determine whether the master or slave processor has failed, to recover from the failure by degrading error detection, and to provide error coverage during subsequent memory reads.

SUMMARY OF THE INVENTION

The previously stated specific objects of the invention can be summarized as the provision of a lockstep processor system which has error isolation built into the system and provides, in a large number of instances of detected error, high speed recovery with only small changes to current lockstep processor systems.

Briefly, this invention contemplates the provision of a lockstep processor system which adds error detection, isolation, and recovery logic to one or more lockstep processor system functions; namely, control outputs, processor inputs, I/O busses, memory address busses, and memory data busses.

For the control outputs, both lockstep processors and a receiver function are used to detect an error, isolate the failure causing the error, and recover from the failure. Both processors and the receiver function use a common clocking source. Both processors generate parity over their respective control lines in sending control commands to the receiving function. The receiving function receives the control lines from each processor independently, checks the lines, performs a bit compare to detect and isolate any error, and transmits good control outputs for later use. As part of the process of isolating a source of an error as occurring in the master or slave processor, the receiving function also determines if the system can recover from the error and, if recoverable, the receiving function notifies the processors to disable the lockstep function and disable the failing processor.

The processor inputs are checked using checking logic and communication signals between the processors. Each processor notifies the other processor if it has detected an error, isolates the failure, and initiates recovery actions. To ensure that the processors are synchronized from a cycle perspective, a common clock source is used to drive both processors.

I/O busses are large and typically include some form of redundancy checking, such as parity. Both processors have the same I/Os, allowing communication between the processors concerning any detected errors. This allows both processors to be identical and allows either to be declared the master and the other processor declared the slave. When transmitting data to an I/O device, error detection and fault isolation from a lockstep error is the responsibility of the slave processor, while recovery is primarily performed by the slave processor with help from the master processor. When receiving data from an I/O device, detection, isolation, and recovery is jointly performed by both the master and slave processors.

Due to the large width of the memory address bus, a commonly used method to detect any address failure is to perform a lockstep comparison on the processor chips. Faults are isolated by adding parity generation to the memory address lines, and checking functions to memory function in addition to the lockstep processors. The memory data bus uses a suitable error correcting code for the memory busses in the lockstep processor system. Checking, fault isolation, and fault recovery occur on the processors themselves; for memory write operations, error detection and fault isolation is the responsibility of the slave processor and recovery is primarily performed by the slave processor. For memory read operations, detection, isolation, and recovery is jointly performed by the master and slave processor.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
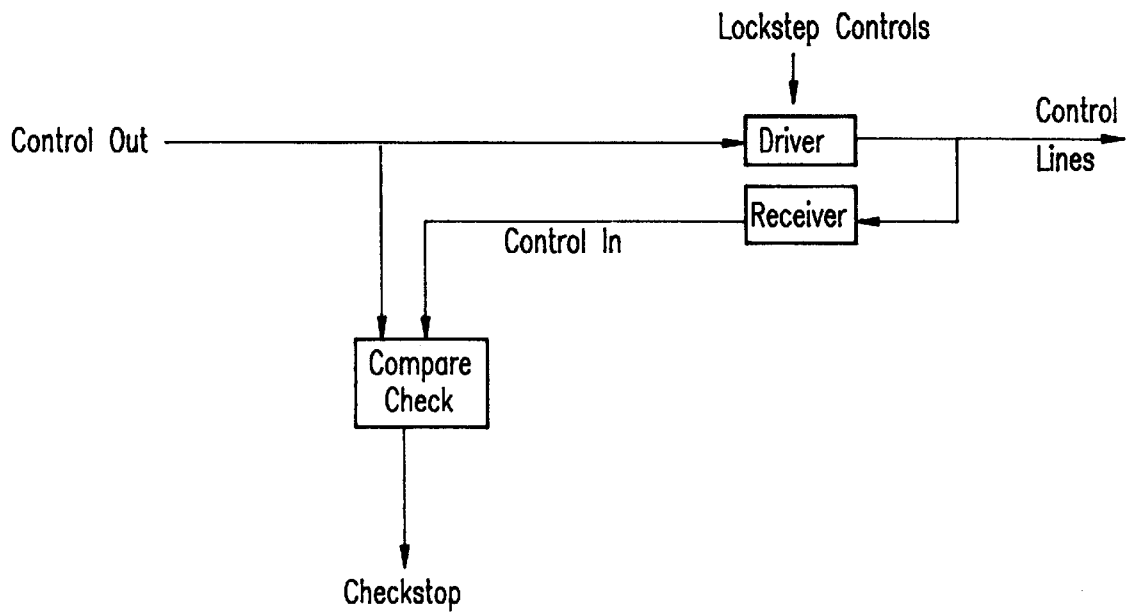
FIG. 1 is a simplified block diagram of a classical implementation of a lockstep processor system.
Figure 2:
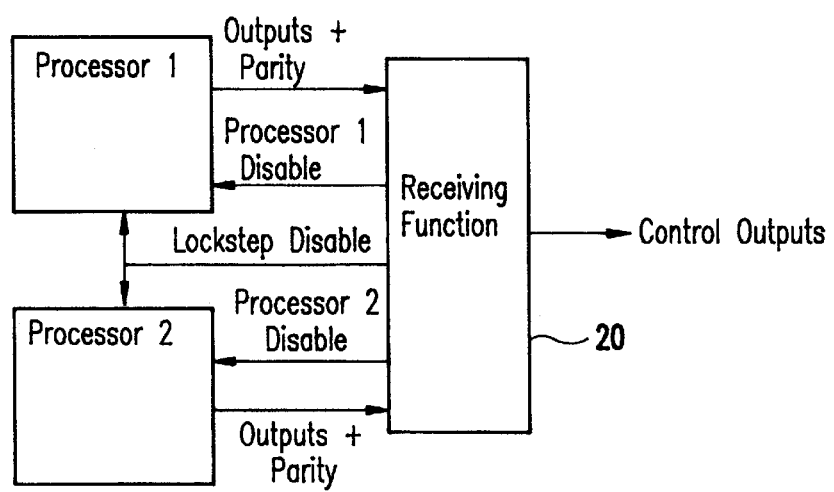
FIG. 2 is a block diagram of a lockstep processor system with fault isolation in the control output busses.
Figure 3:
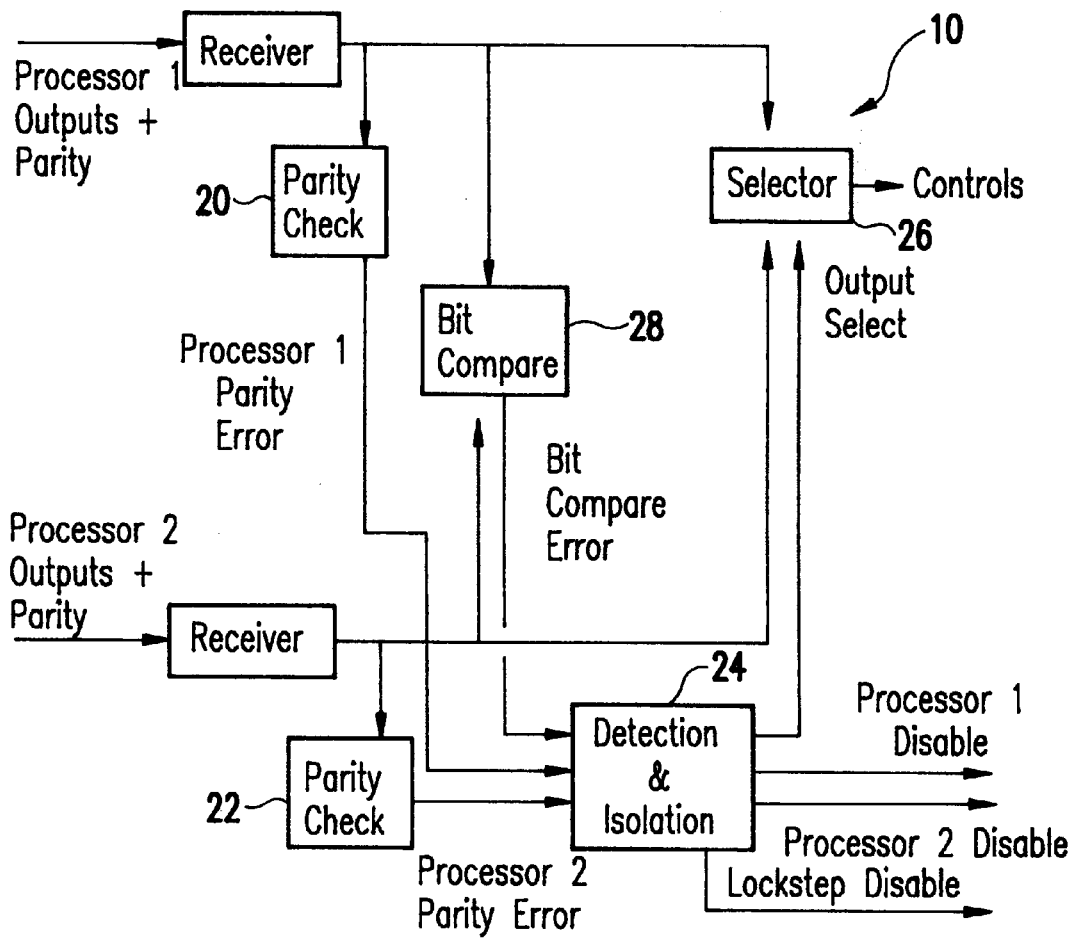
FIG. 3 is a block diagram of the receiver function shown in FIG. 2.

Referring now to FIG. 2, in accordance with the teachings of this invention, a receiver function 10 serves to detect and isolate faults in the control outputs of lockstep processors 1 and 2. A common clock source (not shown) is coupled to the processors 1 and 2 and to the receiver function 10. Each of the lockstep processors generates a parity bit for its control output, which parity bit is transmitted to the receiving function along with its control output. Referring now to FIG. 3, the receiver function 10 receives each control output and its parity signal independently. Parity logic 20 detects any parity error in the control output of processor 1 and parity logic 22 detects any parity error in the control output of processor 2. The outputs of parity logic 20 and 22 are coupled as inputs to error detection and isolation logic 24, whose outputs include a control output select signal coupled to selector 26, a processor 1 disable output, a processor 2 disable output, and a lockstep disable output. In addition to the parity check logic, the receiver function 10 includes bit compare logic 28 which performs a bit-by-bit comparison of control outputs of lockstep processors 1 and 2 The output of the bit compare logic 28 is coupled as another input to the error detection and isolation logic 24.

For each control output line set, parity generation is added to the processor chip. In the simplest case, a parity generator is fed by the control signals. But a preferable method is to predict parity of the control lines from the same signals used to generate the control signals.

In operation, the isolation function determines what recovery action must be invoked. If an error is found in parity checking a particular processor's lines, and no bit compare error is found, either the processor's parity generation logic or its checking logic has failed; therefore, the lockstep feature and that processor are disabled and the other processor is made active, if it is not already the active processor. If an error is found in parity checking a processor's lines and a bit compare error is detected, either the processor's control generation logic or the receiving function receivers have failed; therefore, recovery is performed as in the previous case. If no parity checks are detected but a bit compare error is detected, the processors are out of sync and the system must be stopped. If parity checks are detected on both processor's lines, the system is stopped due to a major failure in either both processors or the receiving function.

Figure 4:
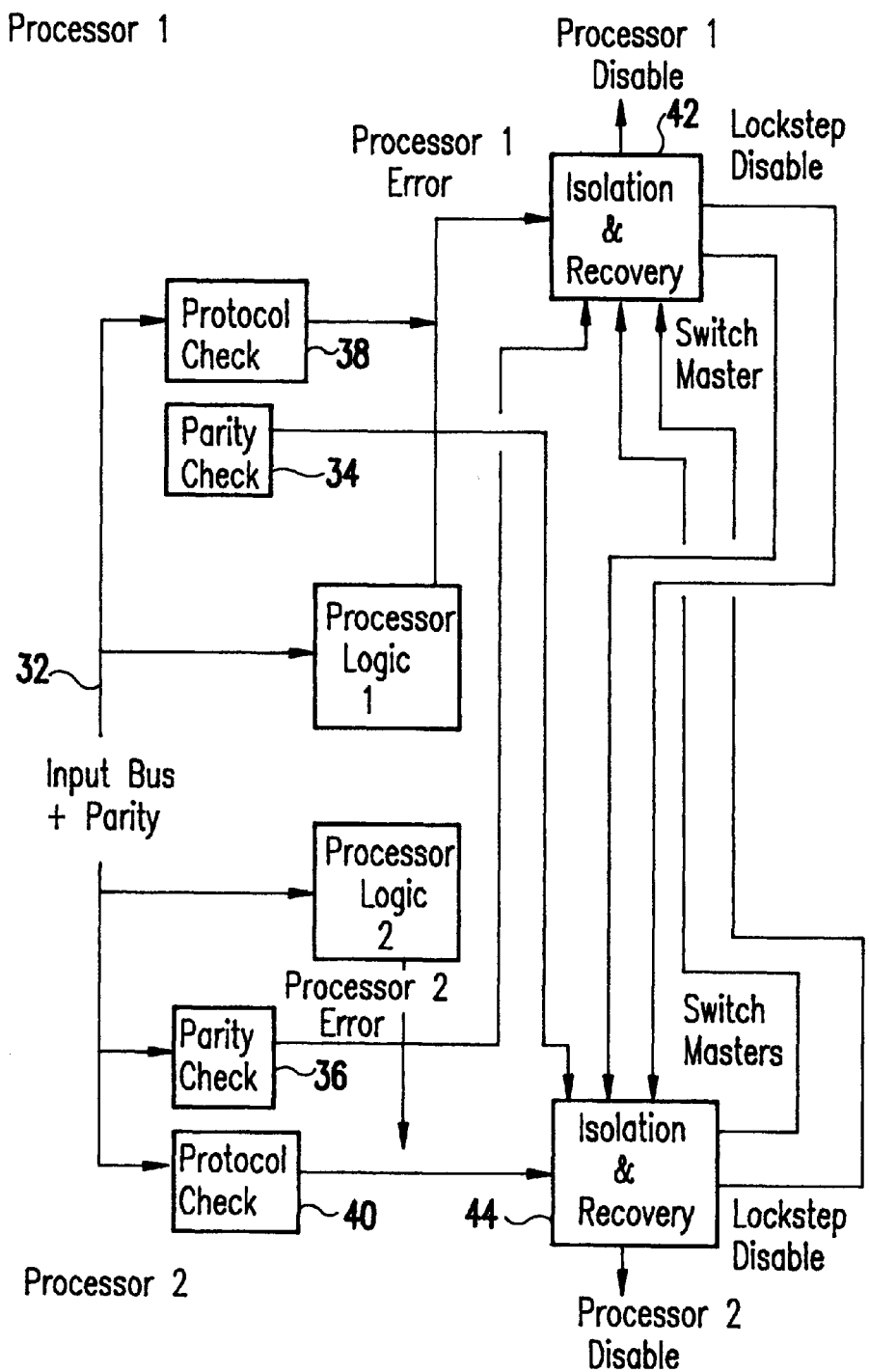
FIG. 4 is a block diagram of a lockstep processor system with fault isolation in the control input busses.

Referring now to FIG. 4, it shows the checking, isolation, notification, and recovery logic for a typical set of input busses to the lockstep processors, which in this exemplary embodiment, includes parity check bits. An input bus 32 (including parity) is driven to each processor 1 and 2 simultaneously to ensure that the processors are synchronized. Using the same net to drive the inputs, the processors 1 and 2 see the exact same signal in the same clock cycle. Since either processor can be master or slave, the same logic is used for both. In addition to parity checking logic (i.e.

parity check logic 34 for processor 1 and parity check logic 36 for processor 2) this embodiment of the invention also includes protocol check logic 38 for processor 1 and protocol check logic 40 for processor 2. The outputs of parity check logic 34 and protocol check logic 38 for processor 1 are coupled to isolation and recovery logic 42 for processor 1. Similarly, the outputs of parity check logic 36 and protocol check logic 40 for processor 2 are coupled to isolation and recovery logic 44 for processor 2. In addition, any error signal from processor 1 error detection logic is coupled to isolation and recovery logic 44 simultaneously as it is coupled to isolation and recovery logic 42. Similarly, an error signal from processor 2 error detection logic is coupled to isolation and recovery logic 42 simultaneously as it is coupled to isolation and recovery logic 44.

If either processor has detected an error on its inputs, both processors analyze the error to isolate the failure and to determine what corrective action is to be taken. The isolation method will be explained from the point of view of processor 1. If processor 1 detects an error, and processor 2 does not detect an error, it is assumed that processor 1 has an internal problem. If processor 1 does not detect a failure, and processor 2 notifies processor 1 that it has detected an error, it is assumed that processor 2 has an internal problem. If both processors detect an error, it is assumed that either the driving function has failed or that there is a failure on the processor system board. Similarly, the same isolation decisions are made when we look at processor 2.

Having isolated the failure, the system determines automatically what recovery action should be initiated. If the failure is determined to be in the driving function, or on the board, the master processor initiates a normal recovery technique for that error or stops the system since no recovery is possible. Looking at the recovery actions for a particular processor requires knowing which processor is master and which processor is slave. If the slave processor has determined that it has failed, the slave processor degrades the system fault detection by simply disabling itself and disabling the lockstep feature on both processors. If the master processor has determined that the slave has failed, the master processor degrades the system fault detection by disabling the lockstep feature on both processors and notifying the slave processor to disable itself. If the master processor detects that it is in error, the master processor degrades the system fault detection by disabling the lockstep feature on both processors, disabling itself, and then notifying the slave processor to become the active processor. If the slave processor detects that the master processor has failed, the slave processor degrades the system fault detection by disabling the lockstep feature on both processors, disabling the master processor, and then allowing itself to become the active processor. The corrective action to each potential error condition is shown in Table 1.

TABLE 1

Input Error Scenarios

| Master | Slave | Action | Explanation |
| --- | --- | --- | --- |
| No Error | No Error | None | |
| No Error | Error | Degrade Fault Detection | Slave Processor Has Failed |
| Error | No Error | Degrade Fault Detection, Slave Made Active | Master Processor Has Failed |
| Error | Error | Stop the System | Error External to the Processors |

Figure 5:
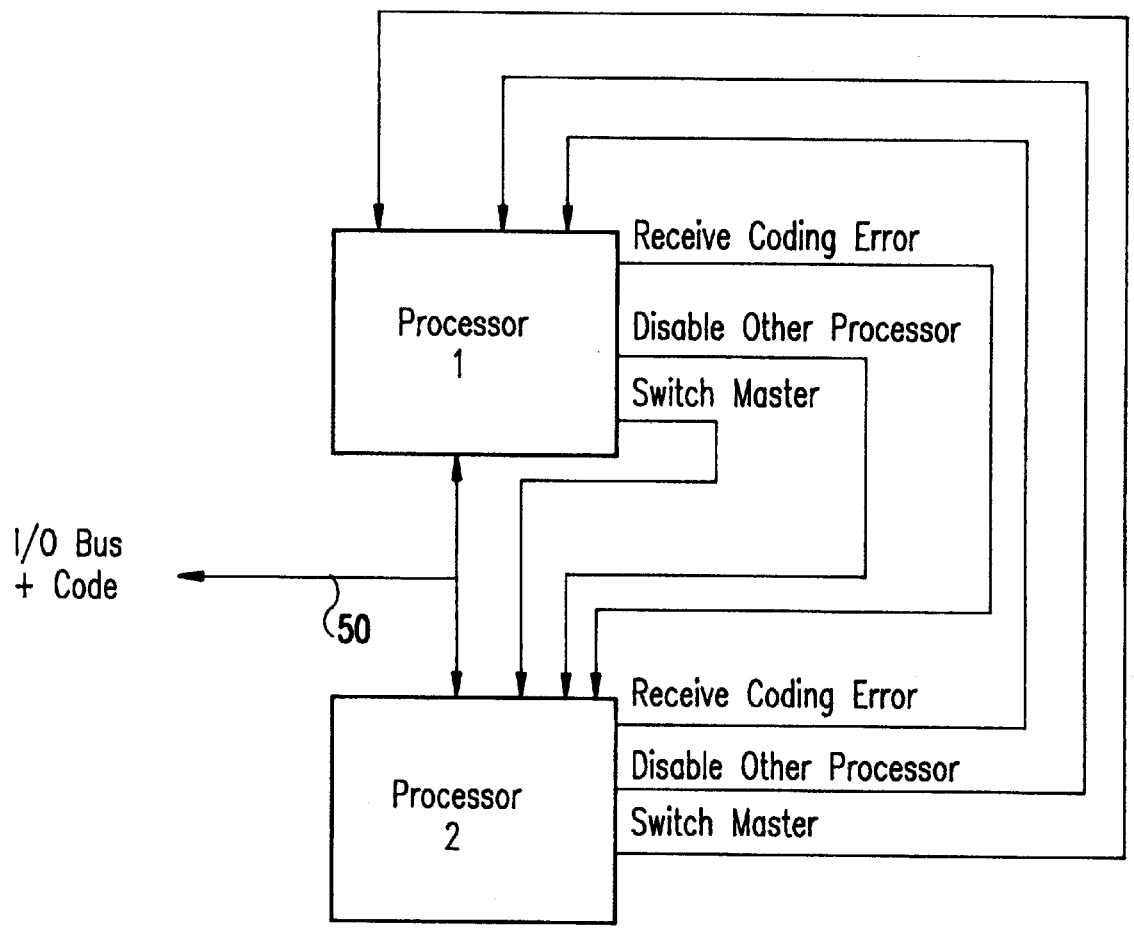
FIG. 5 is a block diagram of a lockstep processor system with fault isolation in the control I/O busses.

With the exception of stopping the system, the recovery actions are invisible to the system. For errors that cause the system to be stopped, a checkstop signal is raised as soon as possible to ensure that no errors are propagated to the rest of the system. Any areas that the error may have propagated will require resetting to a known condition. If the slave processor is in error, the master processor ignores all lines from the slave processor starting with the cycle after the failure is detected. The slave processor is then stopped as quickly as possible. If the master processor has failed, the degradation of fault tolerance and making the slave processor active processor is performed on a cycle boundary and is completed before the corrupted data can affect the outputs of the master processor. Referring now to FIG. 5, processors 1 and 2 each have the same inputs and the same outputs over I/O bus 50. This allows communications between the processors concerning any errors detected; either processor can be designated master and the other designated slave. Since I/O busses are large and typically are covered by some form of redundancy checking such as parity, all checking, fault isolation, and fault recovery will occur on the processors themselves. When transmitting data to an I/O device, error detection and fault isolation from a lockstep error will be the responsibility of the slave processor, while recovery will be primarily performed by the slave processor with help from the master processor. When receiving data from an I/O device, detection, isolation, and recovery will be jointly performed by both the master and the slave processor.

Figure 6:
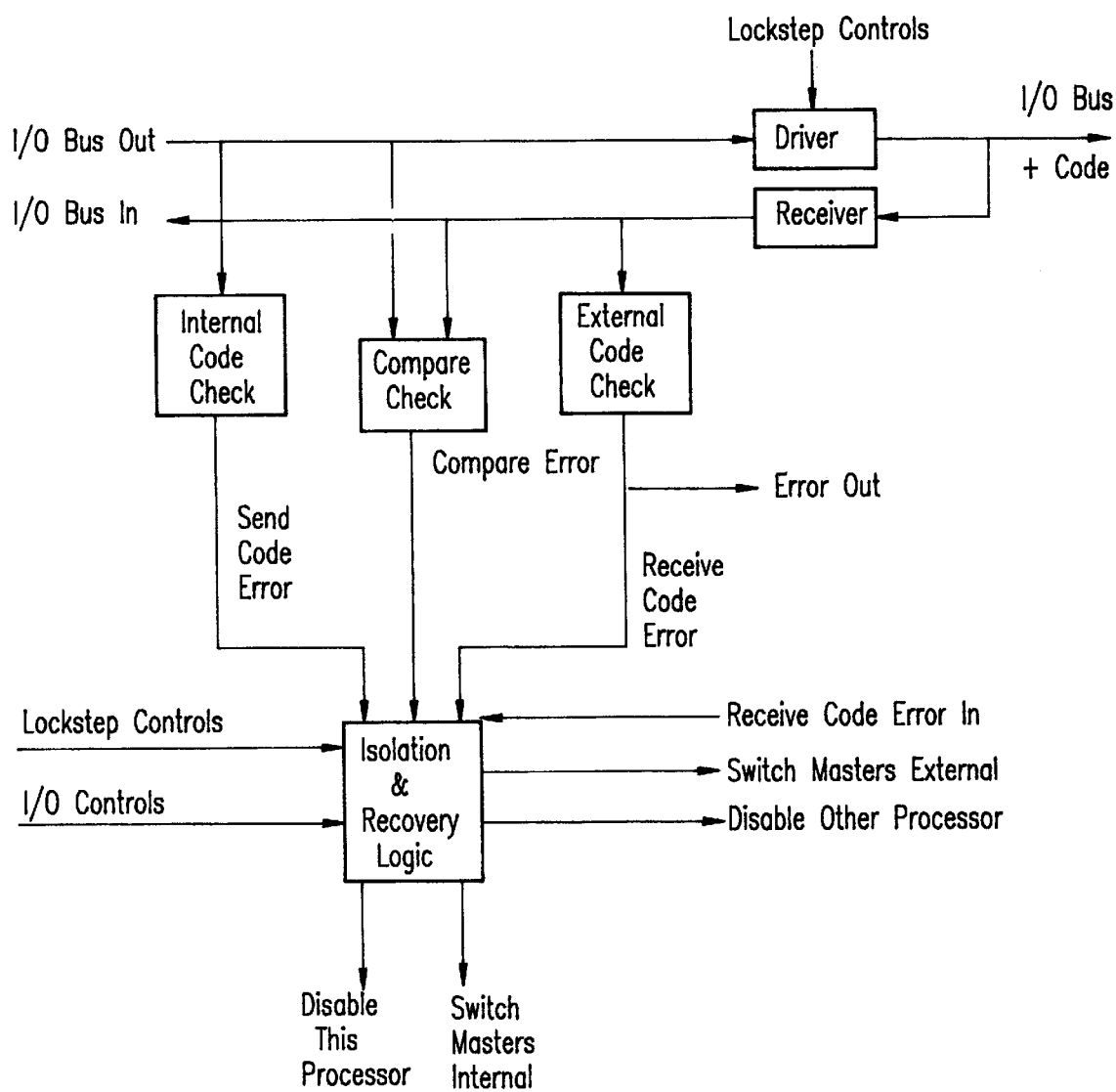
FIG. 6 is a block diagram of detection, isolation, and recovery logic for a processor shown in FIG. 5.

To simplify discussion of the detection, isolation, and recovery actions, the internal design of a single processor is shown in FIG. 6. As shown in FIG. 6, the I/O transmit and receive paths are normally separate until the paths physically reach the transceiver; thus, simplifying the logic for send and receive fault detection and isolation. On the master processor, the transceiver direction is controlled directly by the processor I/O controller; thus acting as it would in a non-lockstep mode. On the slave processor, the transceiver direction will be controlled by both the processor I/O controller as well as the lockstep control logic. When receiving data from an I/O device, both the master and slave processors are in a receive mode to assure that the data is received during the same processor cycle. Since only the master is allowed to physically send data to an I/O device, the slave processor remains in receive mode during I/O writes to allow the slave processor to monitor the data being driven from the master processor.

Since the detection, isolation and recovery activities are independent for send and receive operations, the two will be described separately. When receiving, the data is read by both processors during the valid cycle. Each processor will perform a coding check to detect if any errors have occurred. After performing the check each processor will notify the other processor of the status of its receive function. If neither processor detects an error, processing will continue as normal. If both detect an error the system will stop since the error will be either an I/O device failure or a processor system board failure. If a processor detects an error when the other processor detected no error, the detecting processor will be assumed to have failed, will be stopped, and lockstep disabled. If the slave detects the error, the other processor continues as normal; if the master detects the error, the slave processor will be made the active processor and operation will continue in a degraded error detection mode. The error recovery scenarios for I/O receive operations are shown in Table 2.

TABLE 2

Error Scenarios for I/O Receive Operations

| Master Code Check | Slave Code Check | Action | Explanation |
| --- | --- | --- | --- |
| No Error | No Error | None | |
| No Error | Error | Degrade Fault Tolerance, Disable Slave Processor | Failure in Slave Processor |
| Error | No Error | Degrade Fault Tolerance, Switch Masters | Failure in Master Processor |
| Error | Error | Stop System | Major I/O Device or Board Failure |

When initiating the above actions, care was taken to ensure that the changes are invisible to the system. If the slave is determined to have failed, the master ignores all lines from the slave the cycle after the failure is detected. If the master is determined to have failed when receiving data, the degradation of the fault tolerance and the changing the slave processor to the active processor occurs on a cycle boundary and is completed before the corrupted data can affect any output lines. The stopping of the system due to a major failure occurs as quickly as possible to prevent the error from being propagated in the system.

During an I/O send operation, only the slave processor is involved with lockstep error detection, isolation and recovery. During the send, the slave processor's transceivers are placed in receive mode and the data is sampled only when it is valid on the bus. A coding check is performed on the data sampled from the bus to detect the presence of single errors. A coding check is also performed on the data generated by the slave processor. This check is performed during the same cycle as the cycle in which data from the master processor is checked. In addition, a bit-by-bit compare between the internally generated data and the external data is performed to aid in fault isolation. For example, if no coding check is detected on either bus but a miscompare occurs, the system is stopped because the processors are out of sync. If an error is detected on only one of the data busses and a miscompare is detected, the failed processor is stopped and the system continues to operate in a degraded error detection mode. If both coding checks detect errors, but a no miscompare is detected, the system is stopped since the same error has occurred in each lockstep processor. Table 3 below describes the error conditions and the recovery methods for each of the potential error combinations.

TABLE 3

Error Scenarios for I/O Send Operations

| Master Coding Check | Slave Coding Check | Compare Check | Action | Explanation |
| --- | --- | --- | --- | --- |
| No Error | No Error | No Error | None | |
| No Error | No Error | Error | Stop System | Processors Out of Sync |
| Error | Error | No Error | Stop System | Same Error Both Processors |
| No Error | Error | Error | Degrade Fault Tolerance, Disable Slave Processor | Slave Processor Failed |
| Error | No Error | Error | Degrade Fault Tolerance, Switch Masters | Master Processor Failed |

TABLE 3-continued

Error Scenarios for I/O Send Operations

| Master Coding Check | Slave Coding Check | Compare Check | Action | Explanation |
| --- | --- | --- | --- | --- |
| Error | Error | Error | Stop System | Major Hardware Failure |

As with I/O read operations, the recovery actions for I/O write operations must also be invisible to the system. On major errors that cause the system to be stopped, the checkstop signal is activated as soon as possible to prevent propagation of the failure throughout the system. Areas where the error may have reached will require a reset to a known condition. If a slave failure is detected, the master processor ignores all lines from the slave effectively the cycle after the failure was detected. On an I/O write operation, recovery of a failure of the master processor is the most time critical action. Since this failure is also detected by the I/O device, completion of the disabling of the master and changing the slave processor to the active processor is completed before the I/O device begins its normal recovery activities.

Figure 7:
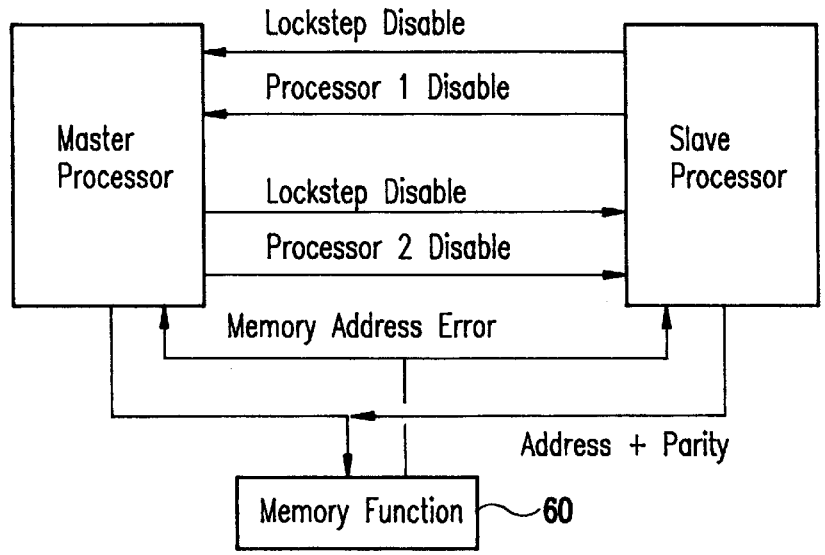
FIG. 7 is a block diagram of a lockstep processor system with fault isolation in the control memory function address busses.

To incorporate fault isolation to the memory address function in accordance with the teachings of this invention, parity generation is added to the memory address lines and check functions are added to the memory function and to the lockstep processors. FIG. 7 is a block diagram at the system level of this lockstep processor memory address function. The memory function 60 receives the address with parity and performs a parity check on those lines. If no error is detected, memory operations continue as normal. If an error is detected, the memory function then notifies the processor chips that it has detected an error, which causes the processors to initiate a retry operation.

Since either processor can be defined as master, the parity generation function and the error detection and isolation logic are found on both processors. These functions, with the exception of the parity predict logic, are disabled in the master processor and the transceivers of the slave processor are placed in receive mode. During a valid memory operation, the slave processor receives the address lines from the master processor, performs a parity check on the bus, and performs a bit compare on each data bit of the address bus. To aid in the isolation of failures, the slave processor also parity checks its internal address bus. The block diagram of the parity generation, error detection, and error isolation functions found on each processor is shown in FIG. 8.

Figure 8:
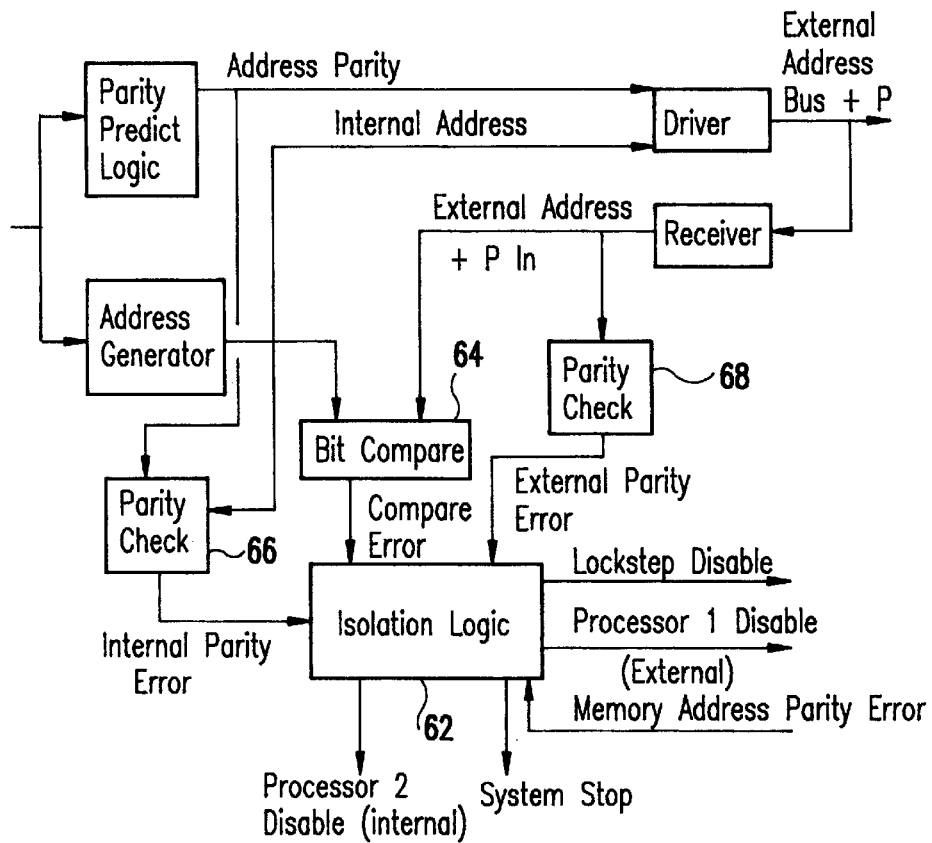
FIG. 8 is a block diagram of detection, isolation, and recovery logic for a processor shown in FIG. 7.

As will be apparent from an inspection of FIG. 8, the fault isolation logic 62 (here shown for processor 1 but duplicated in processor 2) receives bit compare error input from bit compare logic 64, which compares bit by bit the memory address of processor 1 (here labeled internal address) and the memory address of processor 2 (here labeled external address). Isolation logic 62 also receives any parity error indication in the memory address of processor 1 (internal parity error from parity check logic 66) and any parity error indication in the memory address of processor 2 (external parity error from parity check logic 68). Upon detecting an error, the slave processor either retries the memory operation, degrades the fault tolerance of the system by turning off one of the processors, or stops the system. If the slave determines that the failure is in its own logic, the slave disables lockstep feature and disables itself. If the slave determines the failure is the master processor, the slave disables the lockstep feature, disables the master processor, and makes the slave processor the active processor. If the slave processor determines the failure to be in the memory function, the processors initiate a retry of the memory operation and then stop the system if the error persists. The error scenarios are found in Table 4.

paths are normally separate until the paths physically reach the transceiver; thus, simplifying the logic for load and store fault detection and isolation. On the master processor, the transceiver direction is controlled directly by the processor memory controller; thus acting as it would in a non-lockstep mode. On the slave processor, the transceiver direction will be controlled by both the processor memory controller as well as the lockstep control logic. When reading from

TABLE 4

Error Scenarios for Lockstep Address Bus with Partial Isolation

| Slave Parity Check | Master Parity Check | Bit Compare Check | Memory Parity Check | Action | Explanation |
|---|---|---|---|---|---|
| Error | No Error | No Error | No Error | Degrade Isolation, Ignore Parity Predict | Failure in Parity Predict Logic |
| Error | No Error | Error | No Error | Degrade Fault Tolerance. Disable Slave Processor | Failure in Slave's Address Generator |
| No Error | Error | No Frror | No Error | Degrade Isolation, Ignore Master Parity Error | Failure in Master Processor Parity Checker |
| No Error | Error | Error | No Error | Degrade Fault Tolerance, Disable Slave Processor | Failure in Address Line Receivers |
| No Error | No Error | Error | No Error | Stop the System | Processors out of sync |
| No Error | No Error | No Error | Error | Retry Operation | Memory Function Failure |
| No Error | Error | Error | Error | Degrade Fault Tolerance, Make Slave Processor Master | Master Processor Failure |

The recovery actions for these failures are invisible to the system. On major errors that cause the system to be stopped, the checkstop signal is activated as soon as possible to prevent propagation of the failure throughout the system. If a slave failure is detected, the master processor is instructed to ignore all lines from the slave the cycle after the failure was detected. Recovery from failure of the master processor is completed by the time memory retry operation is ready to send the address. In addition, the recovery occurs on a clock boundary to ensure that the degradation of detection and switching active processors is invisible to the system.

Figure 9:
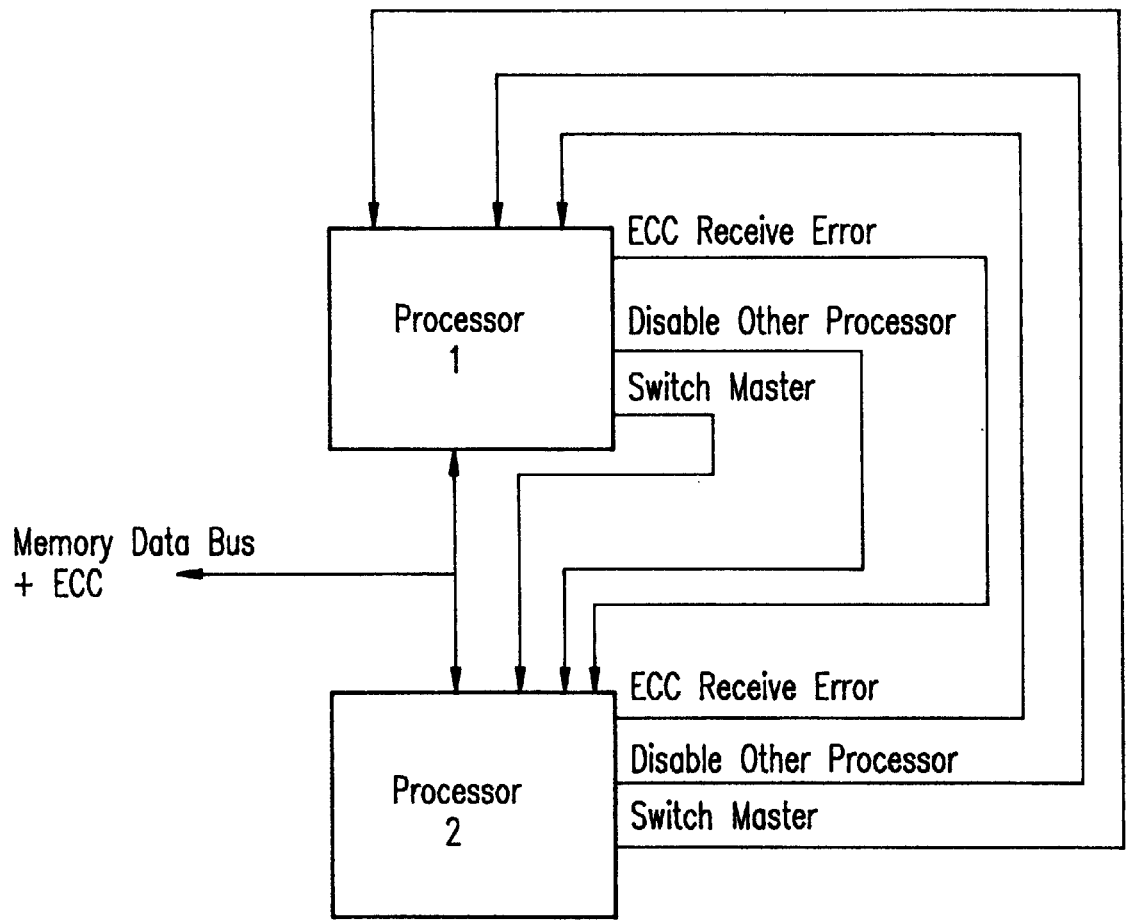
FIG. 9 is a block diagram of a lockstep processor system with fault isolation in the control memory data busses.

Since memory data busses are large and most modern processors support error correcting code (ECC) for the memory busses, all checking, fault isolation, and fault recovery will occur on the processors themselves for memory data bases. For memory write operations, error detection and fault isolation is the responsibility of the slave processor and recovery is primarily performed by the slave processor with help from the master processor. For memory read operations, detection, isolation, and recovery is jointly performed by both the master and the slave processor. The design from a system point of view is shown in FIG. 9. Both processors have the same inputs and outputs to allow communication between the processors concerning any errors detected. This allows both processors to be identical and allows either processor to be declared the master and the other processor declared as the slave processor. In addition, the processors share a common clocking source to eliminate any errors caused by clock skew.

Figure 10:
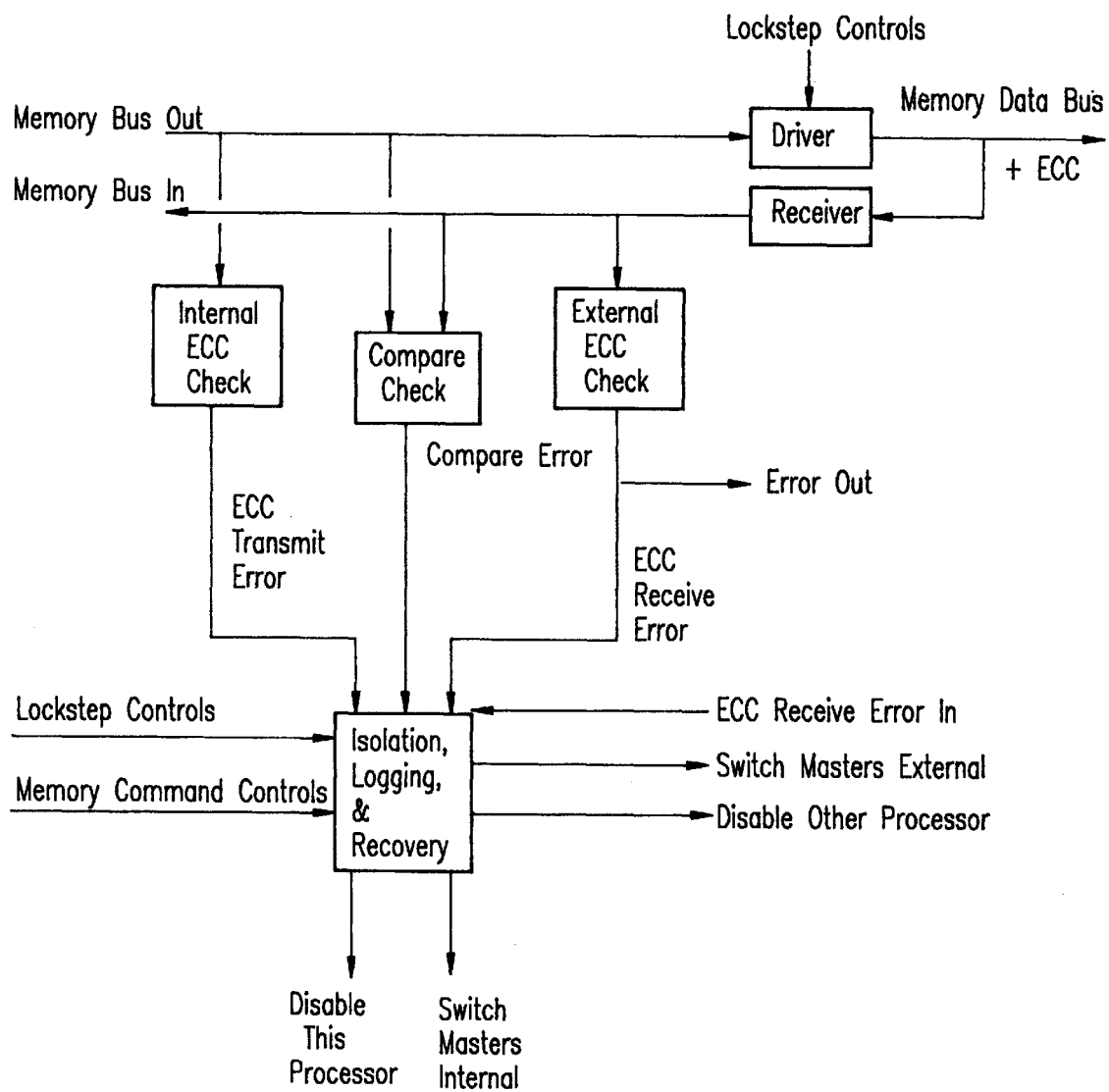
FIG. 10 is a block diagram of detection, isolation, and recovery logic for a processor shown in FIG. 9.

To simplify discussion of the detection, isolation and recovery actions, the internal design of a single processor is shown in FIG. 10. The memory load and memory store data memory, both the master and slave processors are in receive mode to assure that the data is received during the same processor cycle. Since only the master is allowed to physically write memory, the slave processor remains in receive mode during memory writes to allow the slave processor to monitor the data being driven from the master processor.

Since the detection, isolation and recovery activities are independent for read and write operations, the two will be described separately. On a memory read, the data is read by both processors during the valid memory cycle. Each processor will perform an ECC check to determine if any single bit or multiple bit errors have occurred. After performing the check each processor will notify the other processor of the status of its read. If neither processor detects an error or both processors detect a single bit error, processing will continue as normal. Since the error correction logic internal to the processor will correct the single bit error in each processor, they will remain in sync. If both detect a multiple bit error, the system will stop since the error will be either a memory failure or a processor system board failure. If a processor detects either a multiple bit error when the other detected no error or a single bit error or it detects a single bit error when the other detects no error, the detecting processor is assumed to have failed, is stopped, and lockstep is disabled. If the disabled processor is the slave, the other processor continues as normal. If the disabled processor is the master, the slave processor will be made the active processor and operation will continue in a degraded error detection mode. The error recovery scenarios for a memory read operation are shown in Table 5.

TABLE 5

Error Scenarios for Memory Data Bus Read Operations

| Master ECC Check | Slave ECC Check | Action | Explanation |
|---|---|---|---|
| No Error | No Error | None | |
| No Error | Error | Degrade Fault Tolerance, Disable Slave Processor | Failure in Slave Processor |
| Error | No Error | Degrade Fault Tolerance, Switch Masters | Failure in Master Processor |
| Single Bit Error | Single Bit Error | Log Error | ECC Will Handle Error |
| Single Bit Error | Multiple Bit Error | Degrade Fault Tolerance Disable Slave Processor | Failure in Slave Processor |
| Multiple Bit Error | Single Bit Error | Degrade Fault Tolerance, Switch Masters | Failure in Master Processor |
| Multiple Bit Error | Multiple Bit Error | Stop System | Major Memory or Board Failure |

During a memory write operation, only the slave processor is involved with lockstep error detection, isolation and recovery. During the write, the slave processor's transceivers are placed in receive mode and the data is sampled only when it is valid on the memory bus. An ECC check is performed on the data sampled from the memory bus to detect the presence of single or multiple bit errors. An ECC check is also performed on the data that was generated by the slave processor. This check is performed during the same cycle the data from the master processor is checked. In addition, a bit-by-bit compare between the internally generated data and the external data is performed to aid in fault isolation. For example, if no ECC check is detected on either data bus but a miscompare occurs, the system is stopped because the processors are out of sync. If a single bit error is detected on only one of the data busses and a single bit miscompare is detected, the system logs the failure but continues to operate since ECC will correct that error when the data is read. If both ECC checks detect a single bit error but a multiple bit miscompare is detected, the system is stopped since different errors have occurred in the lockstep processors. Table 6 describes the error conditions and the recovery methods from each of the potential error combinations.

While the invention has been described in terms of a single preferred embodiment, those skilled in the art will recognize that the invention can be practiced with modification within the spirit and scope of the appended claims.

Having thus described our invention, what we claim as new and desire to secure by letters patent is as follows:

1. A lockstep processor system including a master processor and a slave processor executing identical tasks independently in lockstep with one another, comprising in combination:

receiver means for comparing data on an output control bus of said master processor with data on a corresponding output control bus of said slave processor and for generating a compare error signal when corresponding bits on the corresponding busses miscompare;

said receiver means isolating a source of said compare error as originating with said master processor or with said slave processor;

said receiver means including:
      means for generating an error detection code in said data on said output control bus of said master processor and means for generating an error detection code in said data on said output bus of said slave processor;

TABLE 6

Error Scenarios for Memory Data Bus Write Operations

| Master ECC Check | Slave ECC Check | Compare Check | Action | Explanation |
|---|---|---|---|---|
| No Error | No Error | No Error | None | |
| No Error | No Error | Error | Stop System | Processors Out of Sync |
| No Error | Single Bit Error | Single Bit Error | Log Error | ECC Will Handle |
| Single Bit Error | No Error | Single Bit Error | Log Error | ECC Will Correct When Read |
| Single Bit Error | Single Bit Error | No Error | Stop System | Major Error |
| Single Bit Error | Single Bit Error | Multiple Bit Error | Stop System | Major Error |
| No Error | Multiple Bit Error | Error | Degrade Fault Tolerance, Disable Slave Processor | Slave Processor Failed |
| Single Bit Error | Multiple Bit Error | Error | Degrade Fault Tolerance, Disable Slave Processor | Slave Processor Failed, ECC Will Correct Master Error |
| Multiple Bit Error | No Error | Error | Degrade Fault Tolerance, Switch Masters | Master Processor Failed |
| Multiple Bit Error | Single Bit Error | Error | Degrade Fault Tolerance, Switch Masters | Master Processor Failed, ECC Will Correct Slave Error |
| Multiple Bit Error | Multiple Bit Error | Error | Stop System | Major Hardware Failure |
| Multiple Bit Error | Multiple Bit Error | No Error | Stop System | Major Hardware Failure | means responsive to said error detection code in said data on said output control bus of said master processor for generating a master processor error signal and means responsive to said error detection code in said data on said output control bus of said slave processor for generating a slave processor error signal; and means responsive to said compare error signal, said master processor error signal, and said slave processor error signal for generating a lockstep disable signal and a processor disable signal.

2. A lockstep processor system as in claim 1 wherein said error detection code includes parity bits.

* * * * *